(12) United States Patent
Olsen et al.

(10) Patent No.: US 8,133,056 B2
(45) Date of Patent: Mar. 13, 2012

(54) PRE-WRITING TEACHING AID AND METHOD TO ASSIST BEGINNING WRITERS IN CREATING LETTERS

(75) Inventors: Janice Z. Olsen, Bethesda, MD (US); Emily Knapton, Omaha, NE (US)

(73) Assignee: No Tears Learning Inc., Cabin John, MD (US)

( * ) Notice: Subject to any disclaimer, the term of this patent is extended or adjusted under 35 U.S.C. 154(b) by 499 days.

(21) Appl. No.: 12/169,973

(22) Filed: Jul. 9, 2008

(65) Prior Publication Data

US 2008/0280270 A1 Nov. 13, 2008

Related U.S. Application Data

(63) Continuation of application No. 11/182,061, filed on Jul. 15, 2005, now Pat. No. 7,458,813, which is a continuation-in-part of application No. 10/775,323, filed on Feb. 11, 2004, now Pat. No. 6,932,613.

(60) Provisional application No. 60/446,269, filed on Feb. 11, 2003.

(51) Int. Cl.
*G09B 1/00* (2006.01)
(52) U.S. Cl. .................................................... 434/160
(58) Field of Classification Search .................. 434/159, 434/160, 162, 165, 166
See application file for complete search history.

(56) References Cited

U.S. PATENT DOCUMENTS

| | | | |
|---|---|---|---|
| 795,855 A | 8/1905 | Olivera | |
| 800,721 A | 10/1905 | Coolidge | |
| 2,682,118 A | 6/1954 | Larsen | |
| 3,075,304 A | 1/1963 | Votolato | |
| 4,090,311 A * | 5/1978 | Lyons | 434/184 |
| 4,143,472 A | 3/1979 | Mura et al. | |
| 4,344,626 A | 8/1982 | Wadland | |
| 4,931,019 A | 6/1990 | Park | |
| 4,998,883 A * | 3/1991 | Brinkley | 434/159 |
| 5,006,000 A | 4/1991 | House | |
| 5,203,706 A | 4/1993 | Zamir | |
| 5,413,355 A * | 5/1995 | Gonzalez | 273/429 |
| 5,425,664 A | 6/1995 | Coffey | |

(Continued)

FOREIGN PATENT DOCUMENTS

BE 858472 1/1978

(Continued)

OTHER PUBLICATIONS

Marilyn Lopes, "National Network for Child Care: Teaching Preschoolers About Written Language", 2003 [retrieved online Jun. 15, 2007].*

(Continued)

*Primary Examiner* — Kurt Fernstrom

(74) *Attorney, Agent, or Firm* — Hogan Lovells US LLP

(57) ABSTRACT

A pre-writing teaching aid and method assists beginning writers in creating letters. The teaching aid includes a tray having a recessed area surrounded by a tray frame. A plurality of cards respectively depict alphanumeric characters, where each of the cards includes a start indicator designating a starting point for forming the depicted character. The students use dough having a consistency that is moldable into strips for forming the alphanumeric characters depicted on the cards in the tray. The teaching aid utilizes multi-sensory teaching methods to make it easy and fun for students to form letters and numbers correctly.

8 Claims, 2 Drawing Sheets

U.S. PATENT DOCUMENTS

| | | | |
|---|---|---|---|
| 5,707,081 | A | 1/1998 | Luna |
| 5,788,503 | A | 8/1998 | Shapiro et al. |
| 5,820,385 | A | 10/1998 | Ohashi et al. |
| 5,899,698 | A | 5/1999 | Sandlin |
| 5,997,309 | A | 12/1999 | Metheny et al. |
| 6,092,294 | A | 7/2000 | Mak |
| 6,135,851 | A | 10/2000 | Drake et al. |
| 6,164,976 | A | 12/2000 | Wilson |
| 6,196,848 | B1 | 3/2001 | Yamazaki |
| 6,416,329 | B1 | 7/2002 | Hirota et al. |
| D467,971 | S | 12/2002 | Mak |
| 6,884,082 | B1 * | 4/2005 | James ............... 434/408 |
| 6,932,613 | B2 | 8/2005 | Olsen et al. |
| 2003/0162153 | A1 * | 8/2003 | Mohn et al. ............ 434/162 |

FOREIGN PATENT DOCUMENTS

| | | |
|---|---|---|
| EP | 1 013 323 | 6/2000 |
| GB | 2 390 823 | 1/2004 |

OTHER PUBLICATIONS

Lopes, Marilyn, "National Network for Child Care: Teaching Preschoolers About Written Language", 1993 [retrieved online Jun. 15, 2007], 2 pp.

University of California Cooperative Extension, "Ready to Succeed: What We Know About Children's Early Learning", May/Jun. 2002 [retrieved online Jun. 15, 2007], 4 pp.

* cited by examiner

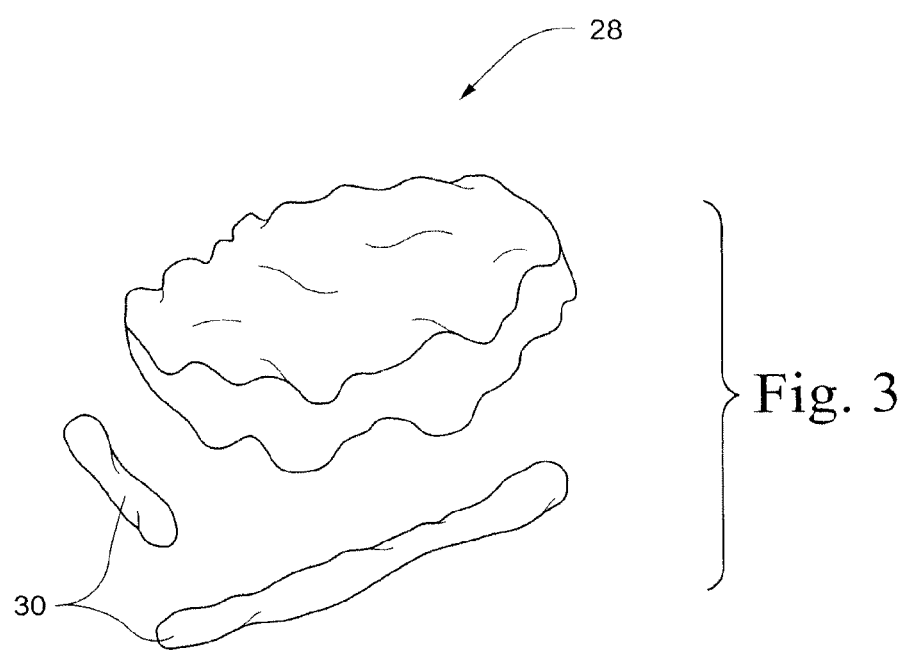

PRE-WRITING TEACHING AID AND METHOD TO ASSIST BEGINNING WRITERS IN CREATING LETTERS

CROSS-REFERENCES TO RELATED APPLICATIONS

This application is a continuation of U.S. patent application Ser. No. 11/182,061, filed Jul. 15, 2005, now U.S. Pat. No. 7,458,813, which is a continuation-in-part of (CIP) of U.S. patent application Ser. No. 10/775,323, filed Feb. 11, 2004, now U.S. Pat. No. 6,932,613, which claims the benefit of U.S. Provisional Patent Application Ser. No. 60/446,269, filed Feb. 11, 2003, the entire contents of each of which are herein incorporated by reference.

STATEMENT REGARDING FEDERALLY SPONSORED RESEARCH OR DEVELOPMENT

NOT APPLICABLE

BACKGROUND OF THE INVENTION

The present invention relates to a teaching apparatus and method and, more particularly, to a pre-writing teaching aid and method to assist beginning writers in creating letters and pre-writing strokes.

Helping children develop a strong foundation is an important goal for an educator. It is particularly rewarding to teach younger children since relative learning rates of young children are extraordinary, enabling teachers to watch the children blossom in the learning environment they create.

Children love to play, which is how they learn. By playing with one another, children not only learn valuable concepts, they learn how to socialize and get along with others. A play-based learning activity thus serves as an effective teaching tool. Children who feel safe and successful in their environment naturally enjoy participating and being involved with others. It is important to design an activity so that all children can participate even though they may be participating at different developmental levels. The activity should be designed to methodically and consistently teach the words children need to follow directions. When children know the meaning of words such as top/middle/bottom, big/little, line/curve, my turn/your turn, under/over, start/stop, etc., they can easily understand and follow directions. They can participate and complete tasks with confidence.

BRIEF SUMMARY OF THE INVENTION

The teaching aid of the invention incorporates the use of dough to assist beginning writers in creating letters. Dough provides a multi-sensory learning experience for the students that is productive and fun. Start indicators along with a smiley face or other character starting cue and borders make it easy for the students to form letters and numbers correctly.

In an exemplary embodiment of the invention, a pre-writing teaching aid assists beginning writers in creating letters. The pre-writing teaching aid includes a tray including a recessed area surrounded by a tray frame, a plurality of cards respectively depicting alphanumeric characters, and dough, preferably colored differently than the tray or the cards. Each of the cards includes a start indicator, such as an arrow, designating a starting point for forming the depicted character. The dough has a consistency that is moldable into strips for forming the alphanumeric characters depicted on the cards in the tray. The tray preferably includes a visual cue such as a happy face in an upper left-hand corner region of the tray frame. The cards may be sized to fit in the recessed area of the tray, and the alphanumeric characters may be depicted in strips of mock dough. Each of the cards may include an image relating to the depicted alphanumeric character to assist the beginning writers with phonological awareness. In this context, the images are positioned near a top of the card to assist the beginning writers in properly orienting the cards.

In another exemplary embodiment of the invention, a method of assisting beginning writers in creating letters and pre-writing strokes uses the pre-writing teaching aid of the invention. The method includes the steps of (a) a teacher demonstrating how to roll the dough into strips; (b) a student imitating the teacher to roll the dough into strips; (c) selecting a card; (d) the teacher shaping the dough into strips suitable for forming the character depicted on the card; (e) the teacher forming the character depicted on the card in the tray by starting at the starting point; and (f) the student imitating the teacher steps (d) and (e). Step (e) may be practiced for some letters by aligning one of the strips with the visual cue. The method may further include, after step (c) and before step (e), placing the card into the tray.

BRIEF DESCRIPTION OF THE DRAWINGS

These and other aspects and advantages of the present invention will be described in detail with reference to the accompanying drawings, in which:

FIG. 3 is a schematic representation of dough and strips of dough used for forming letters.

DETAILED DESCRIPTION OF THE INVENTION

With reference to the FIGURES, the teaching aid of the invention includes a tray 10 having a recessed area 12 surrounded by a tray frame 14. A visual cue 16, such as a happy face, is provided in an upper left-hand corner region of the tray frame 14. The positioning of the visual cue 16 is deliberate as it serves as a starting point to assist students in learning the "top to bottom, left to right" habit (i.e., correct directionality) in learning to form letters. Many of the letters are formed beginning in the upper left-hand region of the page or letter area, and the positioning of the visual cue 16 reinforces this important concept in learning proper letter formation. The tray 10 gives the students a frame of reference to assist them in forming characters in the correct location, forming letters without reversals, forming letters in the correct size and proportionality, etc. The depth of the tray facilitates use of the dough and may also be filled with sand or shaving cream or the like so students can write out letters in different mediums using their fingers.

Figure 1:
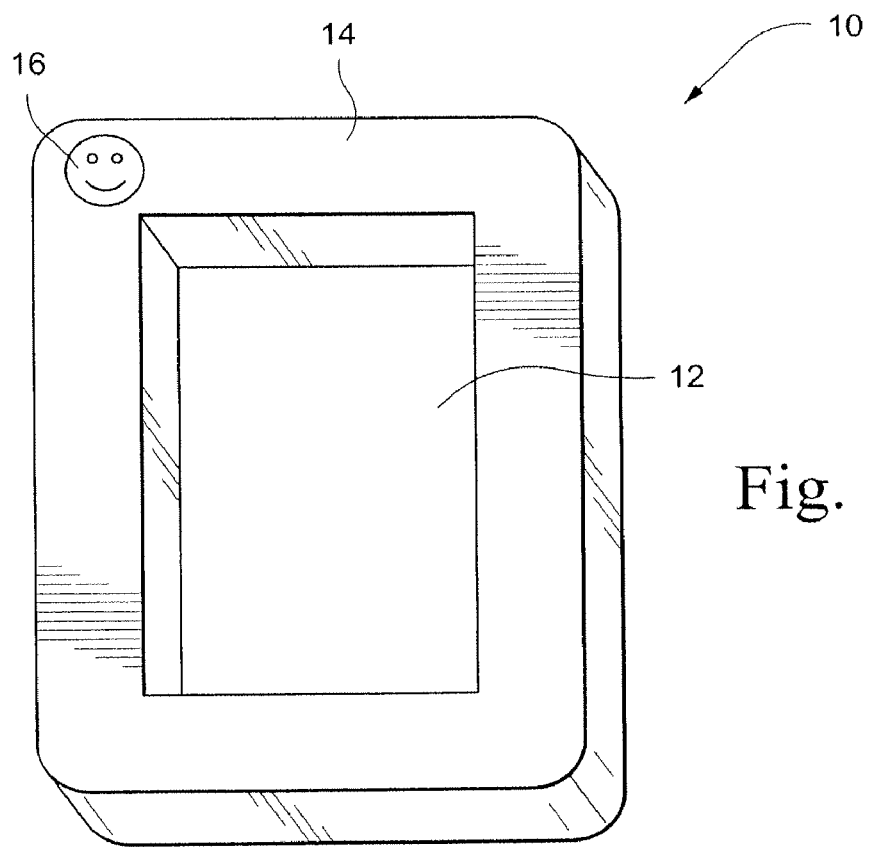
FIG. 1 shows the tray of the teaching aid according to the present invention.
Figure 2:
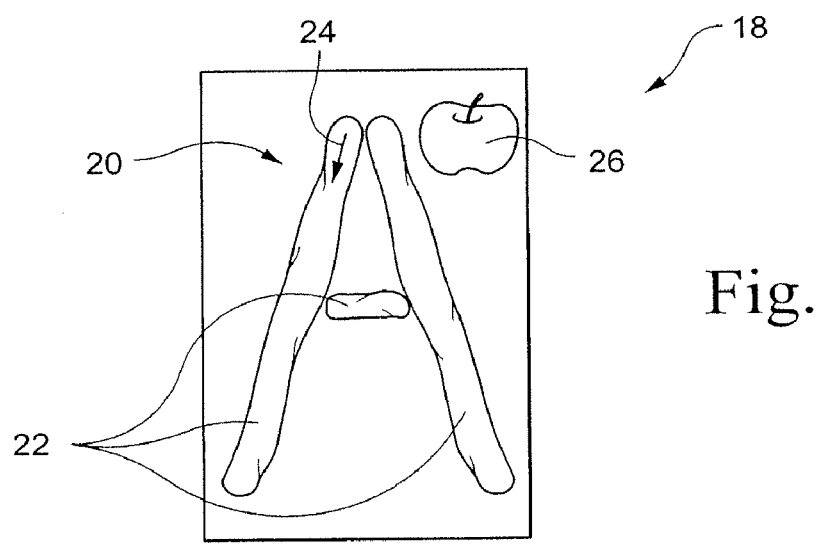
FIG. 2 is an exemplary card for teaching the formation of the letter 'A'.

The teaching aid also includes a plurality of cards 18, an exemplary of one of which is illustrated in FIG. 2. The cards 18 are preferably sized to fit in the recessed area 12 of the tray 10. Each card 18 illustrates an alphanumeric character ('A' in FIG. 2) depicted in strips 22 of mock dough. The card 18 models how the students should form the letters with the rolled out "snakes" of dough. Each character 20 is provided with a start indicator 24 such as an arrow as shown designating a starting point for forming the depicted character 20. Each card 18 also depicts an image 26 that relates to the depicted alphanumeric character 20 to assist the students with phonological awareness. FIG. 2 illustrates an apple. The numeric cards may show a corresponding number of images (e.g., the card depicting the number '3' may illustrate three fish or other images to assist students). As shown, the image 26 is positioned near a top of the card 18, which also serves to assist the students in properly orienting the cards 18.

In a preferred embodiment, the cards 18 are formed from yellow laminated card stock with the characters being shown in mock red dough.

FIG. 3 is a schematic illustration of dough 28 used with the teaching aid of the invention. Any suitable dough may be used having a consistency that is moldable into strips 30 for forming the alphanumeric characters 20 depicted on the cards 18. Preferably, the dough 28 is colored differently than the tray 10 and the cards 18.

In a teaching method using the teaching aid of the invention, a teacher may first demonstrate how to roll the dough 28 into strips 30. The students then imitate the teacher. This activity helps children build strength in their fingers and hands. When the students are comfortable rolling the dough 28 into strips 30, either the teacher or students selects one of the cards 18. The teacher then shapes the dough 28 into strips 30 suitable for forming the character 20 depicted on the card 18. Subsequently, the teacher forms the character 20 depicted on the card 18 in the tray 10 by starting at the starting point. The students then imitate the steps illustrated by the teacher. As noted, for many letters, the character 20 is formed at first by aligning one of the strips 30 with the visual cue 16. Preferably, after selecting the card 18, the card 18 is placed in the recessed area 12 of the tray 10. The students can then place their strips 30 directly on the card 18 to ensure they are forming the letter properly. Of course, as the students learn to form the letters, the card 18 can be removed, and the students can form the letters from the strips 30 of dough 28 directly on the tray 10.

With the teaching aid of the invention, beginning writers can learn to properly form characters using multi-sensory methods. The smiley face starting cue and tray borders make it easy for students to form letters and numbers correctly.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of assisting beginning writers in creating letters and pre-writing strokes using a pre-writing teaching aid, said method comprising:
   (a) providing a tray including a recessed area surrounded by a tray frame, and a plurality of cards respectively depicting alphanumeric characters and each card sized corresponding to the recessed area within the tray frame,
   (b) selecting a particular card from the plurality of cards having a particular alphanumeric character depicted thereon;
   (c) placing the particular card within recessed area of the tray;
   (c) placing a shaping material within the tray on top of said particular card; and
   (d) shaping the shaping material so that it depicts a trace of the particular alphanumeric character.

2. A method according to claim 1, wherein said plurality of cards each include a start indicator designating a starting point for forming the alphanumeric character depicted thereon.

3. A method according to claim 1, wherein said shaping material is a substance that covers said particular card, and said shaping material is shaped within the tray by tracing the particular alphanumeric character in the shaping material.

4. A method according to claim 3, wherein said shaping material is shaving cream.

5. A method according to claim 3, wherein said shaping material is sand.

6. A method according to claim 3, wherein said particular alphanumeric character is traced in said shaping material with a finger to reveal the depiction of said particular alphanumeric character.

7. A method according to claim 1, wherein said shaping material is a strip of dough, and during said placing and shaping steps said strip of dough is formed into the shape of at least a portion of the particular alphanumeric character and positioned within the tray atop said at least a portion of the particular alphanumeric character.

8. A method according to claim 1, further comprising:
   (e) emptying said tray of at least said particular card;
   (f) placing said shaping material within the tray in said recessed area; and
   (g) shaping the material directly within the recessed area of the tray so as to form the particular alphanumeric character.

\* \* \* \* \*